(12) United States Patent
Ulrich et al.

(10) Patent No.: US 7,138,080 B2
(45) Date of Patent: Nov. 21, 2006

(54) POLYAMIDE MOLDING COMPOSITIONS

(75) Inventors: Ralph Ulrich, Ratingen (DE); Detlev Joachimi, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 10/850,912

(22) Filed: May 21, 2004

(65) Prior Publication Data

US 2004/0242757 A1    Dec. 2, 2004

(30) Foreign Application Priority Data

May 27, 2003   (DE)   ............................... 10324324

(51) Int. Cl.
*B28B 3/20*   (2006.01)
*C08L 77/00*   (2006.01)

(52) U.S. Cl. .................. 264/176.1; 524/284; 524/323; 524/356; 524/379; 524/514

(58) Field of Classification Search ............. 264/176.1; 524/514, 356, 379, 323, 284
See application file for complete search history.

(56) References Cited

U.S. PATENT DOCUMENTS

| 4,465,821 | A | 8/1984 | Nielinger et al. ........... 528/335 |
| 5,039,786 | A | 8/1991 | Pipper et al. ................ 528/324 |
| 5,250,624 | A | 10/1993 | Teegarden et al. .......... 525/178 |
| 5,645,945 | A | 7/1997 | Nielinger et al. ......... 428/476.3 |
| 5,665,854 | A | 9/1997 | Kosinski et al. ............. 528/336 |
| 5,922,830 | A | 7/1999 | Kinoshita et al. ........... 528/310 |
| 6,455,450 | B1 | 9/2002 | Hofmann .................... 442/415 |

FOREIGN PATENT DOCUMENTS

| GB | 1161911 | 8/1969 |
| JP | 7150414 | 6/1995 |
| JP | 2002-306059 | 10/2002 |

OTHER PUBLICATIONS

Database WPI, Section Ch, Week 199532, Derwent Publications Ltd., London, GB; Class A14, AN 1995-244071; XP002291687 & JP 07 150414 A (Toray Ind Inc) Jun. 13, 1995, Zusammenfassung.
Database WPI, Section Ch, Week 200326, Derwent Publications Ltd., London, GB; Class A14, AN 2003-260298; XP002291686 & JP 2002 306059 A (null) Oct. 22, 2002, in der Anmeldung erwähnt Zusammenfassung.

*Primary Examiner*—Ana Woodward
(74) *Attorney, Agent, or Firm*—Nicanor Köhncke

(57) ABSTRACT

A thermoplastic molding composition comprising polyamide is disclosed. The composition that contains vinyl (co)polymer and an optional solvent is useful in application where inhibited crystallization of polyamide is desirable, including laser-welding.

7 Claims, No Drawings

POLYAMIDE MOLDING COMPOSITIONS

FILED OF THE INVENTION

The present invention relates to thermoplastic molding compositions and more particularly to polyamide molding compositions.

SUMMARY OF THE INVENTION

A thermoplastic molding composition comprising polyamide is disclosed. The composition that contains vinyl (co)polymer and an optional solvent is useful in the application where inhibited crystallization of polyamide is desirable, including laser-welding.

BACKGROUND OF THE INVENTION

Polyamides are distinguished by a large number of advantageous properties, such as e.g. high toughness, high temperature resistance etc., which guarantee them a secure market position in the engineering thermoplastics sector. These basic properties of the polymer are generally modified by the addition of fillers or additives. Polymer and additives together form the so-called molding composition. Polyamide molding compositions are used in many applications. Injection molded parts, e.g. for the automotive market, or extrudates such as films or hollow articles for the packaging sector may be mentioned as examples.

Films and hollow articles containing a polyamide layer are distinguished by a large number of advantageous properties. Particularly worthy of mention are good optical properties, such as high transparency of films or hollow articles with high surface gloss. Also significant are the good mechanical properties, such as high toughness, high puncture resistance, high tear propagation resistance and others. Ease of production and ease of further processing are added to these.

Of particular significance for many areas of application for films and molding compositions, particularly for use in the packaging sector, e.g. for foodstuffs or cosmetics, is control of the rate of crystallization of the material used, to provide a specific influence on properties such as e.g. shrinkage or impact strength.

In the area of the use of polyamide in the production of films, a fundamental distinction must be drawn between the flat film production process and the blown film production process.

Particularly in the area of application in the blown film sector, polyamides with slower crystallization than conventional polyamide 6 are necessary to enable the primary tube to be blown and stretched in the blown film production process before the film has reached too high a degree of crystallization.

At present, this goal is achieved by the use of copolyamides. The most widespread copolyamide in blown film extrusion is a copolyamide consisting of polyamide 6 and polyamide 66, which usually contains between 15 wt. % and 20 wt. % polyamide 66.

However, other copolyamides with delayed crystallization are also described (e.g. EP-A 561 226). Here, copolyamides of caprolactam, isophthalic acid and hexamethylene diamine with reduced crystallinity compared with conventional polyamides are described. Increased transparency of the multi-layer film claimed is achieved by the reduced crystallinity after processing.

These copolyamides are conventionally produced not by the continuous tubular reactor process, which is widespread for polyamide 6, but by special processes, as described in EP-A 98 412, EP-A 393 546 or WO-A 9421711.

It is known that the transparency of polyamides may be improved by incorporating poly-N-vinylpyrrolidones at the polymerization or compounding stage (DE-A 1 595 613).

The Japanese patent application JP-A 2002306059 describes the coextrusion of a blend of 96% polyamide 6-polyamide 66 copolymer with 4% of a crosslinked N-vinylpyrrolidone to produce packaging for foodstuffs having moderate water vapor permeability and a good oxygen barrier.

The use of poly-N-vinyllactam or poly-N-vinylpyrrolidones is also widespread in the fiber production sector. Here, for example, to increase the hydrophilic properties, 3 wt. % to 15 wt. % of the above compounds are incorporated by compounding. A high proportion of poly-N-vinyllactam or poly-N-vinylpyrrolidone has a negative effect on the yellowness index, however (EP 802 268).

In the area of compounded products, nigrosine base is conventionally used to slow down crystallization, but this leads to a black discoloration of the product.

For applications such as the laser transmission welding of polyamide moldings, materials with the lowest possible crystallinity are needed, since the transmission of laser light decreases with increasing crystallinity. Basic principles of laser transmission welding are described in the specialist literature (Kunststoffe 87 (1997) 3, 348–350; Kunststoffe 88 (1998) 2, 210–212; Kunststoffe 87 (1997) 11, 1632–1640; Plastverarbeiter 50 (1999) 4, 18–19; Plastverarbeiter 46 (1995) 9, 42–46).

A prerequisite for the use of laser beam welding is that the radiation emitted by the laser first passes through a joining partner, which is sufficiently transparent for laser light of the wavelength used, and is then absorbed by the second joining partner in a thin layer of a few 100 μm and converted to heat, which leads to melting in the contact zone and finally to the bonding of the two joining partners by a weld. While it is true that, in the wavelength range of the lasers conventionally used for thermoplastic welding (Nd:YAG laser: 1060 nm; high-performance diode laser: 800–1000 nm), partially crystalline thermoplastics such as polyamides, e.g. polyamide 6 (PA6) and polyamide 66 (PA66) are transparent or laser-translucent, the transmission is often inadequate for good weldability, and so modifications are required for higher transmission.

The nigrosine base does indeed reduce crystallinity, but in the frequency range of 800–1100 nm which is of interest for laser transmission welding, it has marked self-absorptions.

The object of the present invention consequently is to develop a polyamide, preferably polyamide 6, composition in which crystallization is inhibited that is characterized by the absence of any undesirable discoloration.

DETAILED DESCRIPTION OF THE INVENTION

Surprisingly, it has now been found that, by adding vinyl homopolymers and/or copolymers of vinyl monomers and preferably a solvent to the polyamide, it has been possible to achieve this object.

Crystallisation inhibition can be achieved preferably with poly-N-vinyllactam and poly-N-vinylpyrrolidone, as well as copolymers consisting of vinyllactam, and/or vinylpyrrolidone and other vinyl monomers, such as e.g. vinyl acetate and/or vinylimidazole and/or quaternized vinylimidazole and/or vinyl acrylate and/or methacrylates, such as e.g. methyl methacrylate, sodium methacrylate or cyclohexyl methacrylate and/or acrylamide and/or acrylonitrile and/or N-vinylcarbazole and/or styrenes, such as e.g. p-aminostyrene, with good distribution in the polymer matrix. For this homogenisation, a solvent for the homopolymers or copolymers can be advantageous according to the invention.

The invention therefore provides compositions containing
A) polyamide and B) vinyl homopolymers and/or copolymers of vinyl monomers and preferably a solvent.

Preferred B) vinyl homopolymers and/or copolymers of vinyl monomers are poly-N-vinyllactam and poly-N-vinylpyrrolidone, as well as copolymers consisting of vinyllactam, and/or vinylpyrrolidone and other vinyl monomers, such as e.g. vinyl acetate and/or vinylimidazole and/or quaternised vinylimidazole and/or vinyl acrylate and/or methacrylates, such as e.g. methyl methacrylate, sodium methacrylate or cyclohexyl methacrylate and/or acrylamide and/or acrylonitrile and/or N-vinylcarbazole and/or styrenes, such as e.g. p-aminostyrene.

Preferred amount of B is 0.005–5 wt. %, particularly preferably 0.005–1 wt. % and especially preferably 50–8000 ppm based on the weight of the composition.

As the solvent C, water, alcohols, such as e.g. polyethylene glycols, ketones, glacial acetic acid, chlorinated hydrocarbons and phenols are preferred.

Particularly preferred are polyethylene glycols with a molecular weight of between 100 g/mol and 2,000 g/mol, and especially preferred are polyethylene glycols with an average molecular weight of between 200 g/mol and 600 g/mol.

Solvent C: preferred amounts are 0.001–5 wt. %, particularly preferably 0.001–1 wt. % and especially preferably 300–4000 ppm, based on the weight of the composition.

In the case of concentrations of B of less than 5,000 ppm, a C) solvent for poly-N-vinyllactam or poly-N-vinylpyrrolidone is preferred in which the poly-N-vinyllactam or poly-N-vinylpyrrolidone is applied directly on to the granules in solution.

In addition, in the case of molding compositions for processing by injection molding or extrusion (profiles, blow-moldings), the molding compositions may contain conventional additives and colorants.

The invention also provides the use of the inventive compositions for the production of polyamide molding compositions and their use for the production of films, hollow articles, injection moldings and extruded profiles.

The invention also provides preferably single-layer or multi-layer films or hollow articles containing at least one layer of the inventive molding composition.

The invention additionally provides packaging containing a film or a hollow article comprising the inventive composition.

The invention additionally provides moldings bonded together by laser transmission welding in which at least the part facing the laser source comprises the inventive composition.

Preferred, particularly preferred or especially preferred are embodiments that make use of the parameters, compounds, definitions and explanations mentioned as preferred, particularly preferred or especially preferred.

However, the definitions, parameters, compounds and explanations listed above, either general or listed in preferred areas, may also be combined with one another, i.e. between the respective areas and preferred areas.

The polyamide contained in the polyamide layer of the molding compositions, films or hollow articles according to the invention is a known, aliphatic or aromatic or partially aromatic homopolyamide or copolyamide or a mixture of several polyamides. For example, and independently of one another, PA6, PA66, PA 11, PA12, PA 46, PA610, polyamide 6, polyamide 10, polyamide 12, polyamide 66, polyamide 610, polyamide 6I, polyamide 612, polyamide 6/66, polyamide 6I/6T, polyamide MXD6, polyamide 6/6I, polyamide 6/6T, polyamide 6/IPDI and copolymers, as well as polymer mixtures of these groups, are preferably used.

PA 6 or PA 66 or a copolyamide of caprolactam units and units derived from hexamethylenediamine and isophthalic acid or hexamethylenediamine and terephthalic acid or hexamethylenediamine and adipic acid is particularly preferably used. These units derived from hexamethylenediamine and isophthalic acid or hexamethylenediamine and terephthalic acid or hexamethylenediamine and adipic acid are called copolyamide proportions. Copolyamide proportions of 0–50 wt. % are preferred, copolyamide proportions of between 0 and 25 wt. % are particularly preferred and 0–15 wt. %, based on A, are especially preferred.

The modification of the polyamides according to the invention preferably takes place with poly-N-vinyllactam and poly-N-vinylpyrrolidones having weight average molecular weights of 20,000 g/mol to 2,000,000 g/mol; polyvinylpyrrolidones having molecular weights of between 50,000 g/mol and 1,500,000 g/mol are particularly preferred and polyvinylpyrrolidones having molecular weights of approx. 1,300,000 g/mol are especially preferred.

The films or hollow articles according to the invention may include one polyamide layer or have a multi-layer construction. In the case of the multi-layer construction, the other layers may include e.g. polyolefins, such as e.g. polyethylene or polyethylene copolymers, such as e.g. copolymers of ethylene and acrylic acid or methacrylic acid or barrier polymers, such as e.g. polyvinylidene chloride or copolymers of ethylene and vinyl alcohol or of other polyamide layers.

The molding compositions, films, hollow articles, profiles or injection moldings according to the invention are produced by known means, e.g by extrusion, coextrusion, coating, laminating, blow molding or injection molding processes. In the case of films, the extrusion or coextrusion may take place e.g. by the so-called chill roll process or by the extrusion blow molding process or coextrusion blow molding process. In the case of multi-layer films or hollow articles, commercially available coupling agents may be used.

The starting polyamides for the polyamide molding compositions according to the invention may be produced by known means in a continuous or discontinuous process. A discontinuous process may be e.g. polymerization in an autoclave. A continuous process may be e.g. polymerization in a continuous tubular reactor. The production preferably takes place by a continuous process. To achieve high molecular weights, as are often needed for use as a film material, polymerization in the melt can be followed by a post-condensation in the solid phase. The addition of the poly-N-vinyllactam or poly-N-vinylpyrrolidones takes place in the form of a homogeneous solution after the last viscosity-building process step directly on to the granules.

Alternatively, addition as a solid or liquid or solution during compounding, e.g. in a twin-screw extruder or kneader, is also possible during the production of compounds. As a further alternative, the addition of the poly-N-vinyllactam or poly-N-vinylpyrrolidones is possible in pure form or as a homogeneous solution, directly before processing suitable compounds on an injection-molding machine.

The molding compositions, films, hollow articles, profiles or injection moldings according to the invention can be further processed or formed before their ultimate end use. Thus, for example, the films according to the invention may be thermo-formed. The films or hollow articles according to the invention may be used e.g. for packaging purposes. Films or hollow articles according to the invention may, for example, be employed for packaging foodstuffs, such as meat and meat products, sausage, cheese, drinks etc. The films or hollow articles according to the invention may also, for example, be employed for packaging cosmetics, such as e.g. sun protection creams, or chemicals, such as e.g. plant protection agents. In addition, the hollow articles according to the invention may be used as pipes or tanks. These can be e.g. pipes or tanks for fuels or oils for cars.

Laser transmission welded injection moldings may be used e.g. as housings for electrical components and/or sensors.

The clear inhibition of crystallisation found here is achieved by the addition of poly-N-vinyllactam or poly-N-vinylpyrrolidone or copolymers consisting of vinyllactam, and/or vinylpyrrolidone as well as other vinyl monomers, such as e.g. vinyl acetate and/or vinylimidazole and/or quaternised vinylimidazole and/or vinyl acrylate and/or methacrylates, such as e.g. methyl methacrylate, sodium methacrylate or cyclohexyl methacrylate and/or acrylamide and/or acrylonitrile and/or N-vinylcarbazole and/or styrenes, such as e.g. p-aminostyrene or a homogeneous solution of poly-N-vinyllactam or poly-N-vinylpyrrolidone, or copolymers consisting of vinyllactam and/or vinylpyrrolidone as well as other vinyl monomers, such as e.g. vinyl acetate and/or vinylimidazole and/or quaternised vinylimidazole and/or vinyl acrylate and/or methacrylates, such as e.g. methyl methacrylate, sodium methacrylate or cyclohexyl methacrylate and/or acrylamide and/or acrylonitrile and/or N-vinylcarbazole and/or styrenes, such as e.g. p-aminostyrene.

Surprisingly, the action of the solution of poly-N-vinyllactam or poly-N-vinylpyrrolidones according to the invention occurs with additions of as little as <500 ppm. Only the homogeneous distribution makes extrusion into films possible, since only in this way may increased fish eye formation be avoided.

In the case of a special application, the polyamides according to the invention may be adapted to form materials with specially adjusted combinations of properties, alone or in combination with processing auxiliary substances, stabilisers, polymeric alloying materials (e.g. elastomers) or also reinforcing materials (such as e.g. mineral fillers or glass fibers). Blends with proportions of other polymers, e.g. of polyethylene, polypropylene or ABS, are also suitable. The properties of the polyamides may be improved by adding elastomers, e.g. in terms of the impact strength of e.g. reinforced polyamides. The many possible combinations enable a very large number of products to be obtained with widely varying properties.

The polyamides produced according to the invention may also be used in a mixture with other polyamides and/or other polymers.

In addition, the polyamide molding compositions may also contain flame retardants, such as e.g. phosphorus compounds, organic halogen compounds, nitrogen compounds and/or magnesium hydroxide, stabilizers, processing auxiliary substances, such as e.g. lubricants, nucleating agents, stabilizers, impact modifiers, such as e.g. rubbers or polyolefins and the like.

In addition to glass fibers, aramid fibers, mineral fibers and whiskers are suitable as fibrous reinforcing fillers. Calcium carbonate, dolomite, calcium sulfate, mica, fluoromica, wollastonite, talcum and kaolin may be mentioned as suitable mineral fillers. To improve the mechanical properties, the fibrous reinforcing fillers and the mineral fillers may be surface-treated.

The addition of the fillers may take place before, during or after the polymerisation of the monomers to form the polyamide. If the addition of the fillers according to the invention takes place after the polymerization, it preferably takes place by addition to the polyamide melt in an extruder. If the addition of the fillers according to the invention takes place before or during the polymerisation, the polymerization can comprise phases in which work is carried out in the presence of 1 to 50 wt. % water.

When they are added, the fillers may already be present as particles with the particle size ultimately occurring in the molding composition. Alternatively, the fillers may be added in the form of precursors, from which the particles ultimately occurring in the molding composition are formed only during the course of the addition or incorporation.

Suitable as fire or flame retardants are, for example, red phosphorus (DE-A-3 713 746 A 1 (=U.S. Pat. No. 4,877, 823) and EP-A-299 444 (=U.S. Pat. No. 5,081,222), brominated diphenyls or diphenyl ethers in combination with antimony trioxide and chlorinated cycloaliphatic hydrocarbons (Dechlorane® plus from Occidental Chemical Co.), brominated styrene oligomers (e.g. in DE-A-2 703 419) and polystyrenes brominated in the nucleus (e.g. Pyro-Check 68® from FERRO Chemicals).

As a synergist to the above-mentioned halogen compounds, for example zinc compounds or iron oxides are used.

As another alternative, melamine salts in particular have proved a suitable flame retardant particularly for unreinforced polyamides.

In addition, magnesium hydroxide has long proved a suitable flame retardant for polyamide.

In addition to glass fibers, the polyamide molding compositions may additionally contain rubber-elastic polymers (often also referred to as an impact modifier, elastomer or rubber).

Sterically hindered phenols and/or phosphites, hydroquinones, aromatic secondary amines, such as diphenylamines, various substituted representatives of these groups and mixtures thereof in concentrations of up to 1 wt. %, based on the weight of the thermoplastic molding compositions, are mentioned as examples of antioxidants and heat stabilisers.

Various substituted resorcinols, salicylates, benzotriazoles and benzophenones may be mentioned as UV stabilizers, which are generally used in quantities of up to 2 wt. %, based on the molding composition.

Sodium phenyl phosphinate, aluminium oxide, silicon dioxide and preferably talcum, for example, may be used as nucleating agents.

Lubricants and mold release agents, which are conventionally used in quantities of up to 1 wt. %, are preferably ester waxes, pentaerythritol stearate (PETS), long-chainfatty acids (e.g. stearic acid or behenic acid), the salts thereof (e.g. Ca or Zn stearate) and amide derivatives thereof (e.g. ethylenebisstearamide) or montan waxes, as well as low molecular weight polyethylene or polypropylene waxes.

Dioctyl phthalate, dibenzyl phthalate, butyl benzyl phthalate, hydrocarbon oils and N-(n-butyl)benzenesulfonamide may be mentioned as examples of plasticizers.

Particularly preferred is the additional use of rubber-elastic polymers (often also referred to as impact modifier, elastomer or rubber).

In general these are copolymers, which are preferably constructed from at least two of the following monomers: ethylene, propylene, butadiene, isobutene, isoprene, chloroprene, vinyl acetate, styrene, acrylonitrile and acrylates or methacrylates with 1 to 18 C atoms in the alcohol component.

These polymers are described e.g. in Houben-Weyl, Methoden der organischen Chemie, vol. 14/1 (Georg-Thieme Verlag, Stuttgart, 1961), pages 392 to 406 and in the monograph by C. B. Bucknall, "Toughened Plastics" (Applied Science Publishers, London, 1977).

Mixtures of rubber types may, of course, also be used.

Suitable as colorants are both organic and inorganic pigments and/or dyes. Carbon black is optionally a component of the pigment mix in very small quantities. The pigments/dyes and/or carbon blacks may optionally also be used as a batch.

Examples of inorganic pigments are antimony trioxide, antimony pentoxide, basic lead carbonate, basic lead sulfate or lead silicate, lithopones, titanium dioxide (anatase, rutile), zinc oxide, zinc sulfide, metal oxides such as Berlin blue, lead chromate, lead sulfochromates, chromium antimony titanate, chromium oxides, iron oxides, cobalt blue, cobalt-chromium blue, cobalt-nickel grey, manganese blue, manganese violet, molybdenum orange, molybdenum red, nickel-antimony titanate, ultramarine blue, as well as metal sulfides such as antimony trisulfide, cadmium sulfide, cadmium sulfoselenides, zirconium silicates, zirconium-vanadium blue and zirconium-praseodymium yellow.

Examples of organic pigments are anthraquinone, azo, azomethine, benzanthrone, quinacridone, quinophthalone, dioxazine, flavanthrone, indanthrone, isoindoline, isoindolinone, methine, perinone, perylene, phthalocyanine, pyranthrone, pyrrolopyrrole and thioindigo pigments as well as metal complexes of e.g. azo, azomethine or methine dyes or metal salts of azo compounds.

Suitable as polymer-soluble dyes are, for example, dispersion dyes, such as those of the anthraquinone series, e.g. alkylamino, amino, arylamino, cyclohexylamino, hydroxy, hydroxyamino or phenylmercaptoanthraquinones, as well as metal complexes of azo dyes, particularly 1:2 chromium or cobalt complexes of monoazo dyes, as well as fluorescent dyes, e.g. those of the benzothiazole, coumarin, oxarine or thiazine series.

The polymer-soluble dyes may also be used in combinations with fillers and/or pigments, particularly with inorganic pigments such as titanium dioxide.

Pigments and/or polymer-soluble dyes may be used. In the case of dyeing molding compositions that have to be laser-translucent, the dyes or pigments used may, of course, have no or only very low absorption in the NIR spectral range and should be compatible with the thermoplastic polymers used according to the invention and not substantially impair their mechanical or other properties.

Suitable pigment additives are e.g. fatty acids with at least 12 C atoms, such as behenic acid or stearic acid, their amides, salts or esters, such as aluminium stearate, magnesium stearate, zinc stearate or magnesium behenate, as well as quaternary ammonium compounds, such as tri($C_1$–$C_4$)-alkylbenzylammonium salts, waxes, such as polyethylene wax, resin acids, such as abietic acid, colophony soap, hydrogenated or dimerised colophony, $C_{12}$–$C_{18}$ paraffin disulfonic acids or alkylphenols.

Preferred are dyes of the pyrazolone, perinone and anthraquinone type, and of the methine, azo and coumarin type.

Also preferred are the metal-containing pigments, such as the inorganic pigments and the metal complexes of azo, azomethine or methine dyes, azomethine, quinacridone, dioxazine, isoindoline, isoindolinone, perylene, phthalocyanine, pyrrolopyrrole and thioindigo colorants and bismuth vanadate.

EXAMPLES

Test Methods

The isothermal crystallization time was measured using differential calorimetry. The measurement of the film index takes place by an optical evaluation system. Here, granules are extruded into a film and defects in the film are characterized according to their size. The film index is a value calculated from the number and size of the defects, on which the defects have a weighted influence according to their size.

Implementation and Results of the Laser Transmission Measurements

The sample sheets of the IR laser-absorbing and the IR laser-transparent material were both tested using a transmission measuring arrangement consisting of a spectrophotometer and a photometer sphere, which detects both directly transmitted light and scattered light. For IR laser-transparent material with layer thicknesses of between 1 and 3 mm, a transmission level of typically 20–70% is displayed.

Materials Used

Durethan® B40 FA, commercially available polyamide from Bayer AG.

Durethan® B40 F, commercially available polyamide 6 from Bayer AG

Durethan® B 38 FKA, commercially available polyamide 6 from Bayer AG

Durethan® B 30 F, commercially available polyamide 6 from Bayer AG

PEG 400 (Polyethyleneglycol 400) [25322-68-3-], commercially available product from Aldrich Luviskol K25 (Polyvinylpyrrolidone K25) [9003-39-8], commercially available product from Aldrich Luviskol K30 (Polyvinylpyrrolidone K30) [9003-39-8], commercially available product from Aldrich Mistron Vapor RP6, commercially available talcum from Luzenac Luviskol K90 (Polyvinylpyrrolidone K90), commercially available product from BASF AG Glass fibers CS 7928, commercially available chopped strands from Bayer AG All % and ppm data are by weight, based on the overall composition.

Example 1

A solution of 468 ppm PEG and 33 ppm Luviskol K90 is added to 6 kg of a commercially available polyamide (Durethan® B40F) in a spiral mixer at 80° C. and mixed for 2 h at 80° C.

In an extruder with a flat film die under a melt pressure of 36 bar, at a melt temperature of 257° C. and a screw speed of 30 rpm, the material is extruded into a film with a width of approx. 300 mm and a thickness of approx. 50 μm. The chill roll temperature is 90° C.

Example 2

A solution of 935 ppm PEG 400 and 123 ppm Luviskol K90 is added to 6 kg of a commercially available polyamide (Durethan® B40F) in a spiral mixer at 80° C. and mixed for 2 h at 80° C.

The extrusion conditions selected are as in Example 1.

Example 3

A solution of 877 ppm PEG 400, 150 ppm talcum and 65 ppm Luviskol K90 is added to 6 kg of a commercially available polyamide (Durethan® B40F) in a spiral mixer at 80° C. and mixed for 2 h at 80° C.

The extrusion conditions selected are as in Example 1.

Example 4

A solution of 826 ppm PEG 400 and 173 ppm Luviskol K90 is added to 6 kg of a commercially available polyamide (Durethan® B40F) in a spiral mixer at 80° C. and mixed for 2 h at 80° C.

The extrusion conditions selected are as in Example 1.

Example 5

A solution of 244 ppm PEG 400 and 122 ppm Luviskol K30 is added to 6 kg of a commercially available polyamide (Durethan® B4° F.) in a spiral mixer at 80° C. and mixed for 2 h at 80° C.

The extrusion conditions selected are as in Example 1.

Example 6

A solution of 205 ppm PEG 400 and 123 ppm Luviskol K25 is added to 6 kg of a commercially available polyamide (Durethan® B40F) in a spiral mixer at 80° C. and mixed for 2 h at 80° C.

The extrusion conditions selected are as in Example 1.

Example 7

A solution of 667 ppm PEG 400 and 333 ppm Luviskol K30 is added to 6 kg of a commercially available polyamide (Durethan® B40F) in a spiral mixer at 80° C. and mixed for 2 h at 80° C.

The extrusion conditions selected are as in Example 1.

Example 8

A solution of 625 ppm PEG 400 and 375 ppm Luviskol K25 is added to 6 kg of a commercially available polyamide (Durethan® B40F) in a spiral mixer at 80° C. and mixed for 2 h at 80° C.

The extrusion conditions selected are as in Example 1.

Example 9

Unreinforced PA 6 (Durethan B30F, a commercial product from Bayer AG) was processed with the additives stated in Table 3 (with addition of Luviskol K90) and glass fibers by compounding in a twin screw extruder (ZSK 32 from Werner und Pfleiderer) at a melt temperature of approx. 270° C. to form a thermoplastic molding composition. The melt was then spun off through a water bath and granulated. The granules obtained were processed into rectangular test specimens (125 mm×12.5 mm×1.5 mm) on an injection-molding machine of the Arburg 320-210-500 type under conditions conventional for molding compositions (melt temperatures of 280° C., mold temperatures 80° C.) for laser transmission measurements.

Comparative Example 1

6 kg of a commercially available polyamide (Durethan® B40 F) are subjected to heat stress as in Example 1 and processed as in Example 1.

Comparative Example 2

6 kg of a commercially available polyamide (Durethan® B40 FA) are subjected to heat stress as in Example 1 and processed as in Example 1.

Comparative Example 3

6 kg of a commercially available polyamide (Durethan® B40 FKA) are subjected to heat stress as in Example 1 and processed as in Example 1.

Comparative Example 4

173 ppm of Luviskol K90 are added to 6 kg of a commercially available polyamide (Durethan® B40F) in a spiral mixer at approx. 140° C. and mixed for 2 h at 140° C.

Comparative Example 5

6 kg of a commercially available polyamide (Durethan® B40F) are subjected to heat stress in a spiral mixer as in Comparative Example 4.

Comparative Example 6

Unreinforced PA 6 (Durethan B30F, a commercial product from Bayer AG) was processed with the additives stated in Table 3 (without the addition of Luviskol) and glass fibers by compounding in a twin screw extruder (ZSK 32 from Werner und Pfleiderer) at a melt temperature of approx. 270° C. to form a thermoplastic molding composition. The melt was then spun off through a water bath and granulated. The granules obtained were processed into test pieces (rectangular test specimens, 125 mm×12.5 mm×1.5 mm) on an injection-molding machine of the Arburg 320-210-500 type under conditions conventional for molding compositions (melt temperatures of 280° C., mold temperatures 80° C.) for laser transmission measurements.

The products from Comparative Examples 1, 2 and 3 as well as Examples 1 to 8 were investigated with respect to their isothermal crystallization times. The data are compiled in the following tables.

TABLE 1

Isothermal crystallization times at 200° C.

| Test | PEG 400 content [ppm] | Polyvinyl-pyrrolidone type | Polyvinyl-pyrrolidone content [ppm] | Isothermal crystallization time at 200° C. [min] |
|---|---|---|---|---|
| Comparative Example 1 | 0 | — | 0 | 4.7 |
| Comparative Example 2 | 0 | — | 0 | 4.0 |
| Comparative Example 3* | 0 | — | 0 | 3.0 |
| Comparative Example 4 | 400 | — | 0 | 4.2 |
| Example 1 | 468 | K90 | 33 | 5.2 |
| Example 2 | 935 | K90 | 65 | 5.9 |
| Example 3* | 877 | K90 | 123 | 3.7 |
| Example 4 | 826 | K90 | 173 | 6.7 |
| Example 5 | 244 | K30 | 122 | 5.8 |
| Example 6 | 205 | K25 | 123 | 5.7 |
| Example 7 | 665 | K30 | 333 | 5.8 |
| Example 8 | 625 | K25 | 375 | 5.5 |

*contain 150 ppm talcum

TABLE 2

Comparison of film indices

| Test | PEG 400 content [ppm] | Polyvinyl-pyrrolidone type | Polyvinyl-pyrrolidone content [ppm] | Film index |
|---|---|---|---|---|
| Comparative Example 4 | 0 | K90 | 174 | 9968 |
| Comparative Example 5 | 0 | — | 0 | 338 |
| Example 4 | 826 | K90 | 174 | 84 |

TABLE 3

Composition of the molding compositions for processing by injection molding / laser transmission welding

| | | Ex. 9 | Ex. 10 | Ex. 11 | Ex. 12 | Ex. 13 | Cp. Ex. 6 |
|---|---|---|---|---|---|---|---|
| PA6, additives[1] | [%] | 69.948 | 69.3 | 68.8 | 68.7 | 67.8 | 70 |
| Glass fibers Bayer CS 7928 | [%] | 30 | 30 | 30 | 30 | 30 | 30 |
| Luviskol K90 | [%] | 0.052[2] | 0.7 | 1.2 | 1.7 | 2.2 | |

[1] Additives in conventional amounts and believed to have no criticality in the context of the invention included nucleating agent (175 ppm microtalcum), mold release agent (0.16% montan ester wax, ethylene glycol bis-montanoate)
[2] Metered as a 17.36% solution in PEG 400

The laser transmission values of the compositions according to Comparative Example 6 and Examples 9–12 were determined in the freshly molded state and after tempering (post-crystallization 4 h/120° C.). The data are compiled in the following tables.

TABLE 4

Results of the transmission measurements* on 1.5 mm thick test pieces

| Wavelength [nm] | Test specimen thickness [mm] | Pretreatment of samples | Ex. 9 | Ex. 10 | Ex. 11 | Ex. 12 | Ex. 13 | Cp. Ex. 6 |
|---|---|---|---|---|---|---|---|---|
| 810 | 1.5 | None, freshly molded | 59 | 60 | 61 | 61 | 62 | 56 |
| 1065 | 1.5 | None, freshly molded | 64 | 66 | 66 | 67 | 68 | 62 |
| 810 | 1.5 | Tempered 4 h 120° C. | 54 | 56 | 56 | 56 | 57 | 53 |
| 1065 | 1.5 | Tempered 4 h 120° C. | 60 | 62 | 62 | 63 | 64 | 59 |

*Total transmission [%], measuring instrument PE Lambda 900, 0°/ diffuse, ref. air T = 100%

Since all the samples are made of very strongly scattering material, the total transmission was evaluated as the sum of direct and diffuse transmission.

The samples corresponding to the comparative examples have much lower transmission at 1000 nm and in the adjacent wavelength range, while the samples according to the invention of Examples 1–4 with Luviskol additive display significantly higher transmission.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for manufacturing films for the packaging sector, comprising:
    producing a molding composition including,
    A) 90–99.995 wt % polyamide,
    B) 0.005–5 wt. % vinyl (co)polymer, and
    C) greater than 0 to 5 wt. % solvent, the wt. % all occurrences being relative to the weight of the composition is used; and
    forming a film from the molding composition.

2. A method according to claim 1, wherein A) is present in an amount of 95–99.994 wt. %, B) is present in an amount of 0.005–1 wt % and C) is present in an amount of 0.001–1 wt. %.

3. A method according to claim 1, wherein A) is present in an amount of 99–99.965 wt. % and B) is present in an amount of 0.005–0.8 wt. % and C) is present in an amount of 0.03–0.4 wt. %.

4. A method according to claim 1 further containing at least one member selected from the group consisting of fillers, reinforcing fillers, conventional additives and colorants.

5. A method according to claim 1 wherein B) is at least one member selected from the group consisting of poly-N-vinyllactam, poly-Nvinylpyrrolklone copolymers of vinyllactam and copolymers of vinylpyrrolidone.

6. A method according to claim 1 wherein A) is polyamide 6.

7. A method according to claim 1 wherein the solvent is a member selected from the group consisting of water, alcohol, ketone, glacial acetic acid, chlorinated hydrocarbon and phenol.

* * * * *